United States Patent Office 3,542,759
Patented Nov. 24, 1970

3,542,759
COPOLYMERIZATES OF POLYHYDROXY AND BIFUNCTIONAL COMPOUNDS REACTED WITH ALKYLENE OXIDES AND PROCESS OF PREPARATION
Erik B. Gelotte and Björn G. F. Söderqvist, Uppsala, Sweden, assignors to Aktiebolaget Pharmacia, Uppsala, Sweden, a company of Sweden
Filed Jan. 27, 1965, Ser. No. 428,444
Claims priority, application Sweden, Jan. 31, 1964, 1,187/64
Int. Cl. C07c 47/18; C08b 25/04
U.S. Cl. 260—209       8 Claims

ABSTRACT OF THE DISCLOSURE

The present invention concerns novel 2-hydroxyalkyl substituted copolymerization products, a method of preparing these products and the use thereof as a molecular sieving medium.

---

Figure 1:
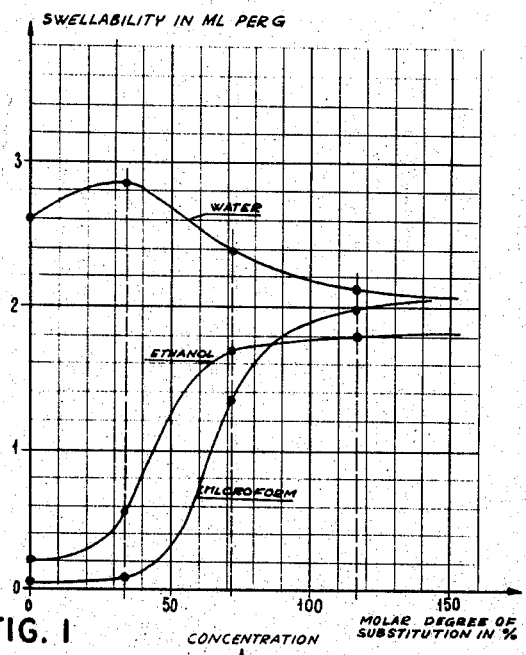

It is known that hydroxyl group-containing substances can be reacted with bifunctional substances of the type X—Y—Z, in which Y represents an aliphatic radical, containing from 3 to 10 inclusive, carbon atoms, and X and Z each represent a member selected from the group consisting of halogen and epoxy, in the presence of an alkaline reacting substance. If the molar ratio between the bifunctional substance and the hydroxyl group-containing substance is selected sufficiently high, insoluble copolymers having varying swellability in water will be obtained. In this connection, it can as a general rule be said that a relatively high ratio yields a low swellability, whereas a relatively low ratio yields a high swellability. An example of copolymerisates of the above-identified type is the copolymerisate of dextran with epichlorohydrin. This and similar copolymerisates have got use for gel filtration purposes.

It has now been found that if the above-identified copolymerisates are reacted with such lower alkylene oxides as 1,2-epoxy-propane or 1,2-epoxybutane, to introduce 2-hydroxyalkyl groups therein to a molar substitution degree of more than about 60 percent, preferably in the range of from 70 to 100 percent, the substitution products obtained will present an excellent swellability in chloroform, and in other organic liquids of moderate polarity such as dimethyl formamide, lower alcohols such as methanol, ethanol and the propanols, ethers such as dioxane, and tetrahydrofurane, and other chlorinoated hydrocarbons such as 1,2-dichloroethane while maintaining the swellability in water. Products having a broad "swellability spectrum" can thus be obtained.

By the expression "molar substitution degree" is meant the average number of substituents per hydroxyl group.

On the basis of what has been set forth above, the present invention therefore concerns novel 2-hydroxyalkyl substituted copolymerisation products comprising a three dimensional macroscopic network of hydroxyl-group containing substances, bonded together by ether bridges the general type —Y—O—R—O—Y—, wherein R represents a residue of the hydroxyl-group containing substances and Y is a member selected from the group consisting of hydrocarbon radicals containing from 3 to 10 carbon atoms and hydrocarbon radicals containing from 3 to 10 carbon atoms, the chain of which is interrupted by at least one ether group, the 2-hydroxyalkyl substituents being of the formula

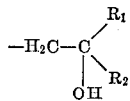

where $R_1$ and $R_2$ each are selected from the group consisting of hydrogen, methyl, and ethyl, $R_1$ and $R_2$ together containing no more than two (2) carbon atoms, said substituted coplymerisation product having a molar degree of substitution of at least 60 percent and being insoluble but swellable in water, ethyl alcohol and chloroform.

The invention also concerns a method for the preparation of novel substitution products from copolymerisates of hydroxyl group-containing substances insoluble in water, but swellable therein, said substitution products having a molar substitution degree of at least about 60 percent, preferably in the range of from 70 to 100 percent, as to present a satisfactory swellability in the type solvents chloroform, ethanol, and water. The invention comprises the step of reacting the copolymerisates of hydroxyl group-containing substances insoluble in water but swellable therein, when in swollen condition, with one or more different substances of the formula

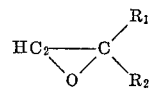

where $R_1$ and $R_2$ each represent a member selected from the group consisting of hydrogen, methyl, and ethyl, $R_1$ and $R_2$ together containing no more than two (2) carbon atoms, or with one or more substances capable of forming the substances of the above formula under alkaline conditions, preferably substances of the formula

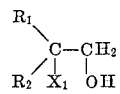

or

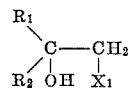

wherein $R_1$ and $R_2$ each have the above significance and $X_1$ represents halogen, preferably chloro or bromo, in the presence of an alkaline substance.

According to a special embodiment of the invention, the copolymerisate insoluble in water but swellable therein, used as a starting material according to the invention, is formed by copolymerisation of one or more hydroxyl group-containing substances such as dextran, with a bifunctional substance of the substance X—Y—Z, in which X and Z each represent a member selected from the group consisting of halogen and epoxy, and Y represents an aliphatic radical, containing from 3 to 10 inclusive carbon atoms.

According to a modification of the invention, the hydroxyl group-containing substance or substances are reacted, before the copolymerization and in the presence of an alkaline reacting substance, with one or more different substances of the formula

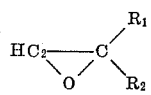

in which $R_1$ and $R_2$ each have the above significance, or with one or more substances capable of forming, respectively, the substance and the substances having this formula to a molar substitution degree of at least about 60 percent, preferably in the range of from 70 to 100 percent, whereupon the product thus obtained is copolymerized into an insoluble product having the desired swellability in the type solvents above referred to, namely, water, ethanol and chloroform.

As a general rule it can be said that it is more suitable first to copolymerize the hydroxyl group-containing substance to an insoluble product and then carry out the substitution with one or more alkylene oxides as set forth above. The advantages of proceeding in this way are among other things that after the substitution the product will be insoluble and can therefore be washed free of by-products, for example on a filter, very readily. If the substitution is carried out prior to the copolymerization, the product will have to be purified by repeated precipitations after the substitution, which results in technical drawbacks as compared with washing on a filter. A further advantage of effecting the substitution after the copolymerization is that it is generally desirable to obtain the process product in the form of pearl- or ball-shaped grains, which depends upon the fact that grains shaped in this way offer the least possible flow resistance in packed beds. Pearl- or ball-shaped grains or particles can be obtained by causing the copolymerization into an insoluble product to take place in such a manner as to suspend the phase in which the copolymerization takes place into drops within a liquid which is immiscible with the phase in which the copolymerization takes place. If the substitution of the hydroxyl group-containing substance is carried out before the copolymerization, difficulties will possibly arise to find a liquid which is suitable as the continuous phase in the pearl-polymerization process, because the substituted hydroxyl group-containing substances have as a rule a broad spectrum of solubility.

The above mentioned modification of the invention will, however, yield advantages in those cases when the hydroxyl group-containing substances used as a starting material are materials of the type cellulose which are difficultly soluble due to strong intermolecular hydrogen bonds and consequently difficult to copolymerize into a homogeneous product. By first carrying out the substitution with one or more alkylene oxides as mentioned above, the tendency towards forming hydrogen bonds will disappear and the products will then be copolymerizable into a homogeneous product.

Copolymerisates adapted as starting materials for the process according to the present invention can be obtained by copolymerizing organic hydroxyl group-containing substances with bifunctional organic substances containing halogen atoms and/or epoxy groups, capable of reacting with the hydroxyl groups of the first mentioned substance with formation of ether-like bridges to form copolymerisates having the above-mentioned properties. Organic substances suitable as starting materials for this reaction are polysaccharides, for example dextran, starch, dextrin, cellulose, polyglucose, or hydroxyl group-containing derivatives of these substances such as hydroxyethyl cellulose or products obtained by partial depolymerization of the latter as well as fractions thereof, polyvinyl alcohol and low molecular weight polyols, such as sorbitol and sacharose. Of special interest are the copolymerisates of dextran because they have proved properties rendering them especially well adapted as gel filtration separating medium.

As examples of suitable bifunctional substances for the reaction mention may primarily be made of bifunctional derivatives of glycerine such as epichlorohydrin, dichlorohydrin, 1,2,3,4-diepoxybutane, bis-epoxypropyl ether, ethylene glycol-bis-epoxypropyl ether, 1,4-butan-diol-bis-epoxypropyl ether and similar.

The copolymerization of the said organic hydroxyl group-containing substances with the bifunctional substances readily takes place in aqueous solution in the presence of an alkaline reacting substance as a catalyst with formation of a three-dimensional network, linked together by ether bridges of the type —O—Y—O—, in which Y is for example an aliphatic radical containing from 3 to 10 carbon atoms.

The swellability of the above mentioned products in an aqueous medium depends on the presence of the hydroxyl groups and the ether bridges and can be expressed as the quantity of water in grams or milliliters which can be absorbed by 1 gram of the dry product (water regain). The swellability of the products according to the invention are preferably in the range or from 1 to 50 ml. per gram, but is generally in the range of from 1 to 20 ml. per gram One of the radicals $R_1$ and $R_2$ in the above formulae commonly represents hydrogen, which means that the substance to be reacted obtains the formula

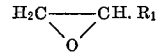

wherein $R_1$ is hydrogen, methyl or ethyl.

Suitable substances having this formula are 1,2-epoxypropane and 1,2-epoxybutane. As indicated above, the corresponding halohydrins of the formula

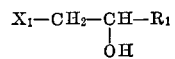

or

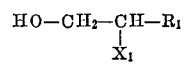

wherein $X_1$ is halogen, may also be used, because these compounds undergo a halogen splitting-off process to formation of the corresponding epoxy compounds under the alkaline conditions prevailing in the reaction. In the latter case the quantity of alkaline substance present must be sufficiently high to neutralize the hydrogen halide split off.

In order to characterize the products according to the invention, it has been selected to set forth the swellability in three solvents or more exactly in water, ethyl alcohol, and chloroform. Of these type solvents, water represents the most polar and chloroform the least polar, ethyl alcohol taking up an intermediate position therebetween.

According to a special embodiment of the invention, a copolymerisate of dextran with epichlorohydrin, having a swellability in the range of from 1 to 50 ml. per gram is reacted with a mixture of 1,2-epoxypropane and 1,2-epoxybutane in a molar ratio in the range of from 1:3 to 3:1, to prepare a product which has essentially the same swellability in the three type solvents above set forth.

The process products prepared according to the invention, which are chemically very stabile, make it possible to carry out molecular sieving operations to separate substances from each other from a solution in chloroform or similar solvents. As shown above, products can be prepared which can also be used simultaneously for the separation of substances from each other from solutions in water and ethanol. In view of the fact that the molecular sieving technique is expected to obtain a great importance for the fractionation of substances such as polymers from organic solvents, the invention will involve a great technical progress.

EXAMPLE 1

A copolymerisate of dextran with epichlorohydrin having a swellability in water of 2.6 ml. per gram was subjected to the following series of tests.

Three portions marked A, B and C, each weighing 20 grams of the copolymerisate were swollen in 50 ml. of an aqueous one molar solution of trisodiumphosphate and the swollen gel was suspended by agitation in 100 ml. of heptane. The three portions A, B and C were then reacted with respectively 14, 42 and 126 ml. of 1,2-epoxypropane at 50° C. for 16 hours. The reaction products were worked up by suspending the reaction mixtures in water, decanting off the heptane, neutralizing with hydrochloric acid, filtering off the gels, washing them free of salt with water, washing them with ethanol, shrinking them with petroleum ether, and drying them in a heat oven. The products were then characterized by their swellability in water, ethanol and chloroform and by their molar degree of substitution. The results are evident from FIG. 1. It is evident from this diagram that when the degree of substitution exceeds about 50 percent, the swellability will be obtained in addition to water and ethanol, also in chloroform. The product C had also a satisfactory swellability in the following common organic solvents.

| | Ml. per g. |
|---|---|
| Dimethyl formamide | 2.0 |
| Tert. butanol | 1.6 |
| Dioxane | 1.6 |

EXAMPLE 2

Figure 2:
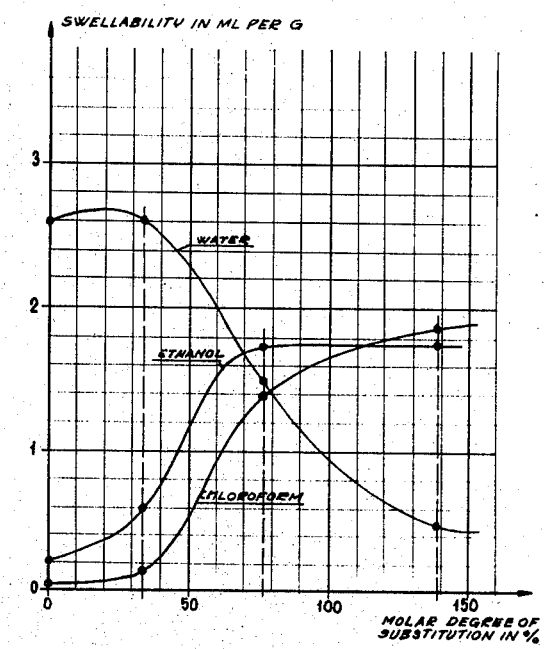

A series of experiments in analogy with what is set forth in Example 1 was carried out with 1,2-epoxybutane at 70° C. Respectively 16.52 and 160 ml. were used. The results are evident from FIG. 2. It is evident that if the degree of substitution exceeds about 50 percent swellability will be obtained, in addition to water and ethanol, also in chloroform. For higher degrees of substitution the swellability in water will disappear. Product C also had a satisfactory swellability in the following common organic solvents:

| | Ml. per g. |
|---|---|
| Dimethyl formamide | 2.2 |
| Tert. butanol | 1.7 |
| Dioxane | 1.8 |

EXAMPLE 3

20 g. of a copolymerisate of dextran with epichlorohydrin having a swellability of 20 ml. per g. were swollen in 150 ml. of an aqueous molar solution of trisodium phosphate. The gel was suspended in 300 ml. of heptane and reacted with 150 ml. of 1,2-epoxypropane for 16 hours at 50° C. After working up according to what is set forth in Example 1, a product having the following swellability was obtained:

| | Ml. per g. |
|---|---|
| Water | 41 |
| Ethanol | 31 |
| Chloroform | 27 |

EXAMPLE 4

40 g. of a copolymerisate of dextran will epichlorohydrin having a swellability in water of 2.5 ml. per g. were swollen in 80 ml. of an aqueous one molar solution of sodium hydroxide, suspended in 140 ml. of ligroin, and reacted with 60 ml. of 1,2-epoxypropane and 80 ml. of 1,2-epoxybutane for 6 hours at 50° C. and for 16 hours at 70° C. After working up according to what is given in Example 1, a product of the following swellability was obtained:

| | Ml. per g. |
|---|---|
| Water | 1.76 |
| Ethanol | 1.73 |
| Chloroform | 1.71 |

The swellabilities are summed up by the expression 1.73±2% ml. per g.

EXAMPLE 5

20 g. of a copolymerisate of dextran with 1,4-butandiol-bis-epoxypropyl ether having a swellability in water of 2.9 ml. per g. were swollen up in 50 ml. of an aqueous one molar solution of trisodium phosphate. The swollen gel was suspended in 100 ml. of heptane, 130 ml. of propylene oxide were added, and the reaction was permitted to take place at 50° C. for 16 hours. After working up in accordance with what is set forth in Example 1, a product having the following swellability was obtained:

| | Ml. per g. |
|---|---|
| Water | 2.0 |
| Ethanol | 1.8 |
| Chloroform | 2.0 |

EXAMPLE 6

20 g. of a copolymerisate of sorbitol with epichlorohydrin, having a swellability in water of 2.9 ml. per g., were reacted as set forth in Example 5. A product having the following swellability was obtained:

| | Ml. per g. |
|---|---|
| Water | 2.25 |
| Ethanol | 1.9 |
| Chloroform | 2.4 |

EXAMPLE 7

20 g. of a copolymerisate of a hydroxyethyl cellulose, having a molar degree of substitution of 44 percent, with epichlorohydrin, said copolymerisate having a swellability in water of 6.7 ml. per g., were reacted in accordance with what is given in Example 5. A product having the following swellability was obtained:

| | Ml. per g. |
|---|---|
| Water | 3.9 |
| Ethanol | 3.8 |
| Chloroform | 3.9 |

The swellabilities are summed up by the expression 3.85±2 percent.

Testing of process products (A) In order to verify the usability of the process products for gel filtration in chloroform, the following experiments were carried out.

Figure 3:
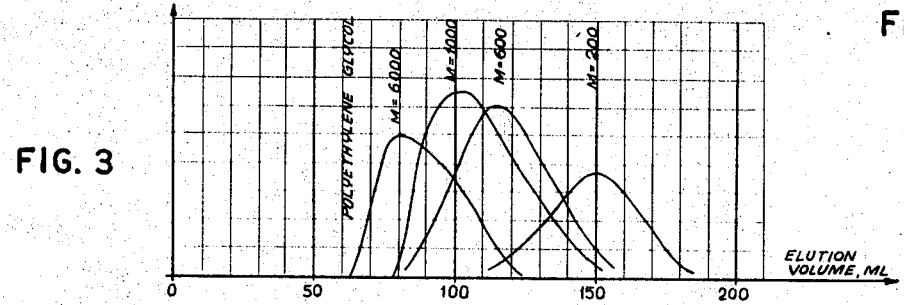

A material as obtained according to Example 4 was swollen in chloroform and was packed in a chromatographic column having an inner diameter of 30 mm. to a bed volume of 220 ml. For each experiment, a sample of 6 ml., containing 250 mg. per ml. of polyethylene glycol having the molecular weight set forth beneath dissolved in chloroform, was charged on the top of the bed. The sample was forced through the column by elution with chloroform at a velocity of about 50 ml. per hour. Fractions were taken out continuously at the discharge end of the column and analyzed by measuring the refractive index. Four experiments with polyethylene glycols (PEG) having the molecular weights (M), respectively, 200, 600, 1,000 and 6,000 were carried out. The elution curves from these experiments are summed up in FIG. 3. It is fully evident that the volumes of elution for the different polyethylene glycols are directly dependent of the molecular weight of the latter, which means that the product functions as a molecular sieving medium.

Figure 4:
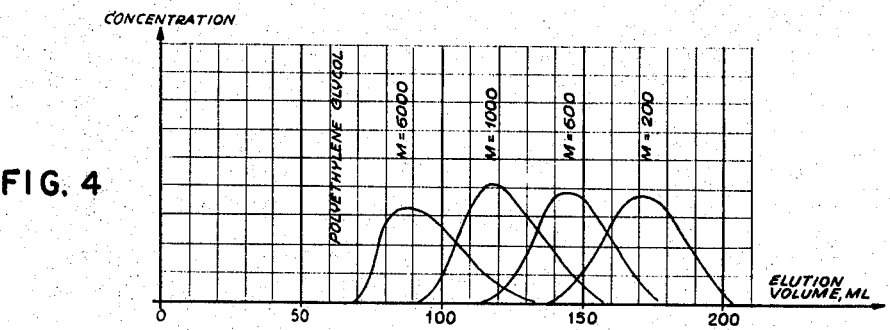

(B) In order to confirm the molecular sieving properties in ethyl alcohol, an experiment was carried out entirely in analogy with what is set forth under A except that the chloroform was replaced by ethyl alcohol. The curves of elution are summed up in FIG. 4. The same conclusion as under A can be drawn.

Figure 5:
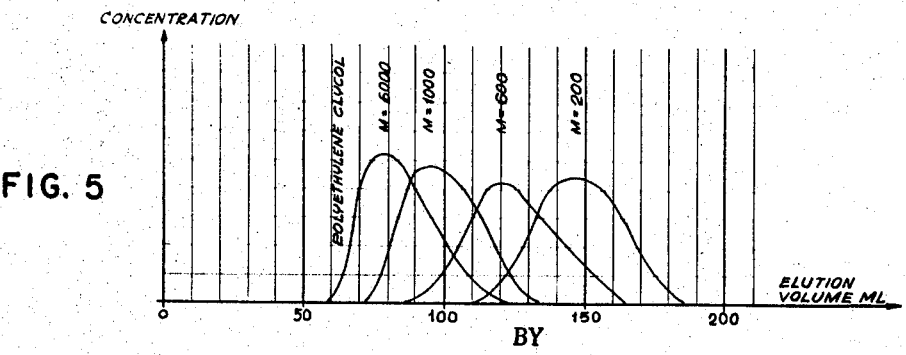

(C) In order to verify the molecular sieving properties of the process compounds in water, an experiment was carried out entirely in analogy to what is set forth under A except that the chloroform was replaced by water. The bed volume in these experiments was 210 ml. The curves of elution obtained are summed up in FIG. 5. The same conclusion as under A can be drawn.

What we claim is:

1. As a novel product, a compound of the formula

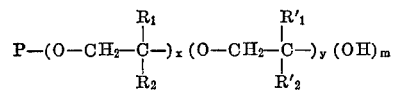

wherein (a) $R_1$, $R_2$, $R'_1$ and $R'_2$ are selected from the group consisting of hydrogen, methyl, and ethyl, (b) $R_1$ and $R_2$ together contain a total of no more than two carbon atoms, (c) $R'_1$ and $R'_2$ together contain a total of no more than two carbon atoms, (d) $x$ is the number of O—$CH_2$—$CR_1R_2$— groups, (e) $y$ is the number of O—$CH_2$—$CR'_1R'_2$— groups, (f) $m$ is the number of OH groups, (g) P is the hydroxyl-group free part of a copolymer of the formula $P(OH)_m$, said copolymer being formed by reacting:
(1) a member selected from the group consisting of dextran, starch, dextrin, cellulose, polyglucose, polyvinylalcohol, sorbitol and sucrose, in aqueous medium in the presence of an alkaline reacting catalyst, with
(2) a bifunctional substance of the type XYZ, wherein
(I) X and Z are each selected from the group consisting of halogen and epoxy radicals, and
(II) Y is an aliphatic radical containing from 3 to 10 carbon atoms and said copolymer $P(OH)_m$ being insoluble but swellable in water,
(h) the average number of substituents per hydroxyl group being more than 0.60, said novel product being insoluble, but swellable in chloroform and insoluble, but swellable in water, and useful as a gel separation filtration medium.

2. A product as claimed in claim 1, wherein the average number of substituents is in the range of 0.70 to 1.5.

3. A product as claimed in claim 1, wherein the copolymer $P(OH)_m$ is a copolymer of dextran.

4. A product as claimed in claim 1 wherein $R_1$ and $R'_1$ are each hydrogen and $R_2$ and $R'_2$ are each methyl.

5. A product as claimed in claim 1, wherein $R_1$ and $R'_1$ are each hydrogen and $R_2$ and $R'_2$ are each ethyl.

6. A product as claimed in claim 1, wherein $R_1$ and $R'_1$ are each hydrogen, $R_2$ is methyl, and $R'_2$ is ethyl, and the molar ratio between the two kinds of substituents being within the range of from about 1:3 to 3:1.

7. A method for producing the product of claim 1 which comprises reacting (A) a copolymer of the formula $P(OH)_m$, when the latter is in swollen condition, and in the presence of an alkaline reacting substance, said copolymer being formed by reacting:
(1) a member selected from the group consisting of dextran, starch, dextrin, cellulose, polyglucose, polyvinylalcohol, sorbitol and sucrose, in aqueous medium in the presence of an alkaline reacting catalyst, with
(2) a bifunctional substance of the type XYZ, wherein
(I) X and Z are selected from the group consisting of halogen and epoxy radicals, and
(II) Y is an aliphatic radical containing from 3 to 10 carbon atoms and said copolymer $P(OH)_m$ being insoluble but swellable in water;

with (B) a compound of the formula

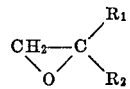

and with (C) a compound of the formula

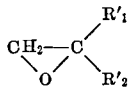

wherein P, m, $R_1$, $R_2$, $R'_1$ and $R'_2$ have the significances noted in claim 1.

8. A molecular sieving means comprising a plurality of particles of the novel product set forth in claim 1.

References Cited

UNITED STATES PATENTS

| | | | |
|---|---|---|---|
| 2,996,551 | 8/1961 | DeGroote et al. | 260—209 |
| 3,277,076 | 10/1966 | Yotsuzuka | 260—209 |
| 3,300,474 | 1/1967 | Flodin et al. | 260—209 |
| 3,337,532 | 8/1967 | Lacroix et al. | 260—209 |
| 2,976,274 | 3/1961 | McNeely et al. | 260—209 |
| 3,042,666 | 7/1962 | Gentles | 260—209 |
| 3,048,577 | 8/1962 | Gaertner | 260—209 |

LEWIS GOTTS, Primary Examiner

J. R. BROWN, Assistant Examiner

U.S. Cl. X.R.

210—24; 260—212, 233.3, 615